United States Patent
Wang (10) Patent No.: US 10,778,988 B2
(45) Date of Patent: Sep. 15, 2020

(54) METHOD, AN APPARATUS AND A COMPUTER PROGRAM PRODUCT FOR OBJECT DETECTION

(71) Applicant: Nokia Technologies Oy, Espoo (FI)

(72) Inventor: Tinghuai Wang, Tampere (FI)

(73) Assignee: Nokia Technologies Oy, Espoo (FI)

(*) Notice: Subject to any disclaimer, the term of this patent is extended or adjusted under 35 U.S.C. 154(b) by 148 days.

(21) Appl. No.: 16/043,905

(22) Filed: Jul. 24, 2018

(65) Prior Publication Data

US 2019/0058887 A1 Feb. 21, 2019

(30) Foreign Application Priority Data

Aug. 21, 2017 (GB) .................................... 1713345.5

(51) Int. Cl.
| | |
|---|---|
| *H04N 19/17* | (2014.01) |
| *G06T 7/162* | (2017.01) |
| *G06T 7/143* | (2017.01) |
| *G06F 17/18* | (2006.01) |

(Continued)

(52) U.S. Cl.
CPC ............... *H04N 19/17* (2014.11); *G06F 3/08* (2013.01); *G06F 17/18* (2013.01); *G06K 9/00744* (2013.01); *G06K 9/00765* (2013.01); *G06T 7/143* (2017.01); *G06T 7/162* (2017.01); *G06T 2207/10016* (2013.01); *G06T 2207/20072* (2013.01)

(58) Field of Classification Search
CPC ......... H04N 19/17; G06T 7/162; G06T 7/143; G06T 2207/20072; G06T 2207/10016; G06F 17/18

See application file for complete search history.

(56) References Cited

U.S. PATENT DOCUMENTS

| | | | |
|---|---|---|---|
| 6,606,406 B1 * | 8/2003 | Zhang | ............... G06K 9/00201 |
| | | | 382/154 |
| 9,147,255 B1 * | 9/2015 | Zhang | ..................... G06T 7/162 |
| 2008/0123900 A1 | 5/2008 | Ma et al. | |

(Continued)

OTHER PUBLICATIONS

Vazquez-Reina et al., "Multiple Hypothesis Video Segmentation From Superpixel Flows", European Conference on Computer Vision (ECCV), 2010, pp. 268-281.

(Continued)

*Primary Examiner* — Santiago Garcia
(74) *Attorney, Agent, or Firm* — Harrington & Smith (57) ABSTRACT

A method, comprising: receiving a video comprising video frames as an input; generating set of object proposals from the video; generating object tracklets comprising regions appearing in consecutive frames of the video, said regions corresponding to object proposals with a predetermined level of confidence; constructing a graph comprising the object proposals and superpixels grouped from the pixels of the frame; calculating a first cost function for superpixel likelihoods in terms of the object proposals in an object tracklet; calculating a second cost function for object proposal likelihoods in terms of the superpixels in the frame; minimizing the first and the second cost function with each other; computing posterior probabilities of each superpixel; and assigning each superpixel with an object class with a maximum posterior probability to constitute semantic object segmentation.

20 Claims, 3 Drawing Sheets

(51) Int. Cl.
*G06K 9/00* (2006.01)
*G06F 3/08* (2006.01)

(56) References Cited

U.S. PATENT DOCUMENTS

| | | | | |
|---|---|---|---|---|
| 2009/0080774 | A1 | 3/2009 | Lin et al. | |
| 2012/0251003 | A1* | 10/2012 | Perbet | G06T 7/11 382/173 |
| 2012/0275702 | A1* | 11/2012 | Tuzel | G06T 7/11 382/173 |
| 2014/0126810 | A1 | 5/2014 | Wang et al. | |
| 2015/0279049 | A1* | 10/2015 | Tojo | G06K 9/4642 382/164 |
| 2015/0286340 | A1* | 10/2015 | Send | G01S 5/163 345/175 |
| 2016/0004909 | A1* | 1/2016 | Mei | G06K 9/3241 382/103 |
| 2016/0098843 | A1* | 4/2016 | Hashiguchi | G06T 7/187 382/164 |
| 2017/0024635 | A1* | 1/2017 | Drake | G06K 9/6262 |
| 2017/0109871 | A1* | 4/2017 | Nakano | G06T 7/162 |
| 2017/0236290 | A1* | 8/2017 | Sorkine Hornung | G06T 7/11 382/173 |
| 2018/0060669 | A1* | 3/2018 | Pham | G06T 7/11 |
| 2018/0061012 | A1* | 3/2018 | Staranowicz | G06T 3/4007 |
| 2018/0174331 | A1* | 6/2018 | Pham | G06K 9/6215 |
| 2018/0278957 | A1* | 9/2018 | Fracastoro | G06K 9/6224 |
| 2019/0057532 | A1* | 2/2019 | Marzban | G06T 7/33 |

OTHER PUBLICATIONS

Zhang et al., "Video Object Co-Segmentation by Regulated Maximum Weight Cliques", European Conference on Computer Vision (ECCV), 2014, pp. 551-566.

Oneata et al., "Spatio-Temporal Object Detection Proposals", European Conference on Computer Vision (ECCV), 2014, pp. 1-16.

Manen et al., "Prime Object Proposals with Randomized Prim's Algorithm", IEEE International Conference on Computer Vision, Dec. 1-8, 2013, pp. 2536-2543.

Rantalankila et al., "Generating Object Segmentation Proposals using Global and Local Search", IEEE Conference on Computer Vision and Pattern Recognition, Jun. 23-28, 2014, 8 pages.

Kochanov et al., "Scene Flow Propagation for Semantic Mapping and Object Discovery in Dynamic Street Scenes", IEEE/RSJ International Conference on Intelligent Robots and Systems (IROS), Oct. 9-14, 2016, 8 pages.

Zhang et al., "Semantic Object Segmentation via Detection in Weakly Labeled Video", IEEE Conference on Computer Vision and Pattern Recognition (CVPR), Jun. 7-12, 2015, pp. 3641-3649.

Drayer et al., "Object Detection, Tracking, and Motion Segmentation for Object-Level Video Segmentation", Computer Vision and Pattern Recognition, Aug. 10, 2016, pp. 1-17.

Kang et al., "Object Detection from Video Tubelets with Convolutional Neural Networks", IEEE Conference on Computer Vision and Pattern Recognition (CVPR), Jun. 27-30, 2016, pp. 817-825.

Boykov et al., "Fast Approximate Energy Minimization via Graph Cuts", IEEE Transactions on Pattern Analysis and Machine Intelligence, vol. 23, No. 11, Nov. 2001, pp. 1222-1239.

Ma et al., "Hierarchical Convolutional Features for Visual Tracking", IEEE International Conference on Computer Vision (ICCV), Dec. 7-13, 2015, pp. 3074-3082.

Yang et al., "Improved Fast Gauss Transform and Efficient Kernel Density Estimation", Proceedings Ninth IEEE International Conference on Computer Vision, Oct. 13-16, 2003, 8 pages.

Search Report received for corresponding United Kingdom Patent Application No. 1713345.5, dated Feb. 2, 2018, 4 pages.

* cited by examiner

METHOD, AN APPARATUS AND A COMPUTER PROGRAM PRODUCT FOR OBJECT DETECTION

TECHNICAL FIELD

The present solution generally relates to computer vision and artificial intelligence. In particular, the present solution relates to a method and technical equipment for object detection.

BACKGROUND

Many practical applications rely on the availability of semantic information about the content of the media, such as images, videos, etc. Semantic information is represented by metadata which may express the type of scene, the occurrence of a specific action/activity, the presence of a specific object, etc. Such semantic information can be obtained by analyzing the media.

Semantically segmenting object from video remains an open challenge with recent advances relying upon prior knowledge supplied via interactive initialization or correction. Yet fully automatic semantic video object segmentation remains useful in scenarios where the human in the loop is impractical, such as video recognition or summarization or 3D modelling.

Semantic video object segmentation, which aims to recognize and segment objects in video according to known semantic labels, has recently made much progress by incorporating middle- and high-level visual information, such as object detection, which enables building an explicit semantic notion of video objects. However, these approaches typically fail to capture long-range and high-level contexts and may therefore introduce significant errors due to changing object appearance and occlusions.

SUMMARY

Now there has been invented an improved method and technical equipment implementing the method, by which the problems can be at least alleviated. Various aspects of the invention include a method, an apparatus, and a computer readable medium comprising a computer program stored therein, which are characterized by what is stated in the independent claims. Various embodiments of the invention are disclosed in the dependent claims.

According to a first aspect, there is provided a method comprising receiving a video comprising video frames as an input; generating set of object proposals from the video; generating object tracklets comprising regions appearing in consecutive frames of the video, said regions corresponding to object proposals with a predetermined level of confidence; constructing a graph comprising the object proposals and superpixels grouped from the pixels of the frame; calculating a first cost function for superpixel likelihoods in terms of the object proposals in an object tracklet; calculating a second cost function for object proposal likelihoods in terms of the superpixels in the frame; minimizing the first and the second cost function with each other; computing posterior probabilities of each superpixel; and assigning each superpixel with an object class with a maximum posterior probability to constitute semantic object segmentation.

According to an embodiment, the method further comprises determining, from said graph, links between pairs of nodes of the graph.

According to an embodiment, the method further comprises calculating a first weight for connections between each object proposal and its constituent superpixels.

According to an embodiment, the method further comprises calculating a second weight for connections between spatially or temporally adjacent superpixels.

According to an embodiment, the method further comprises calculating a third weight for connections between sequential connections between object proposals within the same tracklet.

According to an embodiment, the first weight and the second weight are used as weights in the first cost function.

According to an embodiment, the first weight and the third weight are used as weights in the second cost function.

According to an embodiment, posterior probabilities of each superpixel are computed according to Bayes rule.

The second and third aspect of the invention relate to an apparatus and a computer readable medium comprising a computer program stored therein arranged to carry out the method.

These and other aspects of the invention and the embodiments related thereto will become apparent in view of the detailed disclosure of the embodiments further below.

DESCRIPTION OF THE DRAWINGS

In the following, various embodiments of the invention will be described in more detail with reference to the appended drawings, in which.

DESCRIPTION OF EXAMPLE EMBODIMENTS

In the following, several embodiments of the invention will be described in the context of computer vision. In particular, the present embodiments are related to video object detection, a purpose of which is to detect instances of semantic objects of a certain class in videos. Video object detection has applications in many areas of computer vision, for example, in tracking, classification, segmentation, captioning and surveillance.

Figure 1:
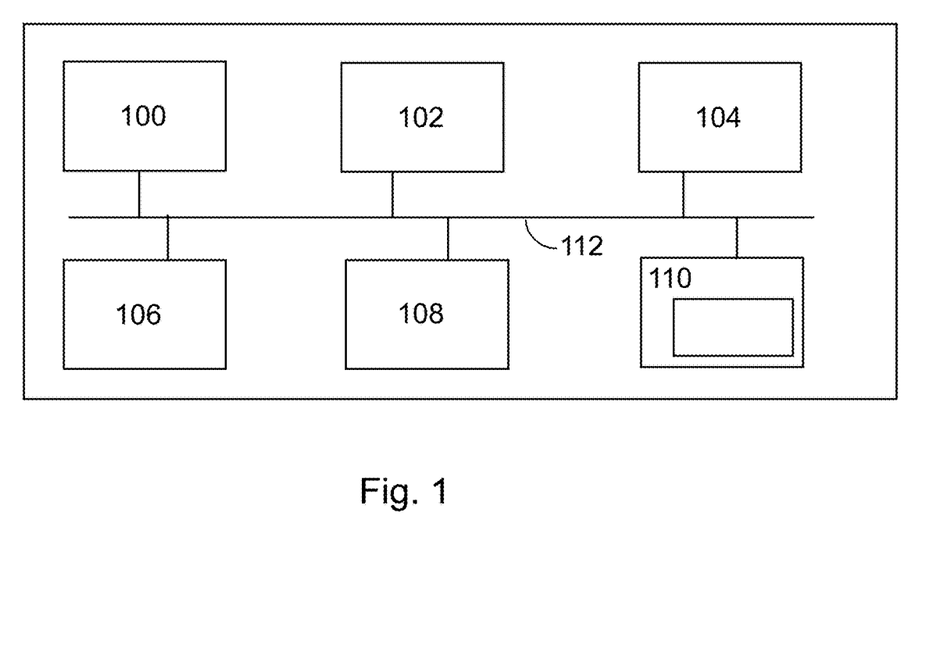
FIG. 1 shows a computer system suitable to be used in a computer vision process according to an embodiment.

FIG. 1 shows a computer system suitable to be used in image processing, for example in computer vision process according to an embodiment. The generalized structure of the computer system will be explained in accordance with the functional blocks of the system. Several functionalities can be carried out with a single physical device, e.g. all calculation procedures can be performed in a single processor if desired. A data processing system of an apparatus according to an example of FIG. 1 comprises a main processing unit 100, a memory 102, a storage device 104, an input device 106, an output device 108, and a graphics subsystem 110, which are all connected to each other via a data bus 112.

The main processing unit 100 is a processing unit comprising processor circuitry and arranged to process data within the data processing system. The memory 102, the storage device 104, the input device 106, and the output device 108 may include conventional components as recognized by those skilled in the art. The memory 102 and storage device 104 store data within the data processing system 100. Computer program code resides in the memory 102 for implementing, for example, computer vision process. The input device 106 inputs data into the system while the output device 108 receives data from the data processing system and forwards the data, for example to a display, a data transmitter, or other output device. The data bus 112 is a conventional data bus and while shown as a single line it may be any combination of the following: a processor bus, a PCI bus, a graphical bus, an ISA bus. Accordingly, a skilled person readily recognizes that the apparatus may be any data processing device, such as a computer device, a personal computer, a server computer, a mobile phone, a smart phone or an Internet access device, for example Internet tablet computer.

It needs to be understood that different embodiments allow different parts to be carried out in different elements. For example, various processes of the computer vision system may be carried out in one or more processing devices; for example, entirely in one computer device, or in one server device or across multiple user devices. The elements of computer vision process may be implemented as a software component residing on one device or distributed across several devices, as mentioned above, for example so that the devices form a so-called cloud.

One approach for the analysis of data in general and of visual data in particular is deep learning. Deep learning is a sub-field of machine learning. Deep learning may involve learning of multiple layers of nonlinear processing units, either in supervised or in unsupervised manner. These layers form a hierarchy of layers, which may be referred to as artificial neural network. Each learned layer extracts feature representations from the input data, where features from lower layers represent low-level semantics (i.e. more abstract concepts). Unsupervised learning applications may include pattern analysis (e.g. clustering, feature extraction) whereas supervised learning applications may include classification of image objects.

Deep learning techniques allow for recognizing and detecting objects in images or videos with great accuracy, outperforming previous methods. One difference of deep learning image recognition technique compared to previous methods is learning to recognize image objects directly from the raw data, whereas previous techniques are based on recognizing the image objects from hand-engineered features (e.g. SIFT features). During the training stage, deep learning techniques build hierarchical layers which extract features of increasingly abstract level.

Thus, an extractor or a feature extractor may be used in deep learning techniques. An example of a feature extractor in deep learning techniques is the Convolutional Neural Network (CNN), shown in FIG. 2. A CNN may be composed of one or more convolutional layers with fully connected layers on top. CNNs are easier to train than other deep neural networks and have fewer parameters to be estimated. Therefore, CNNs have turned out to be a highly attractive architecture to use, especially in image and speech applications.

Figure 2:
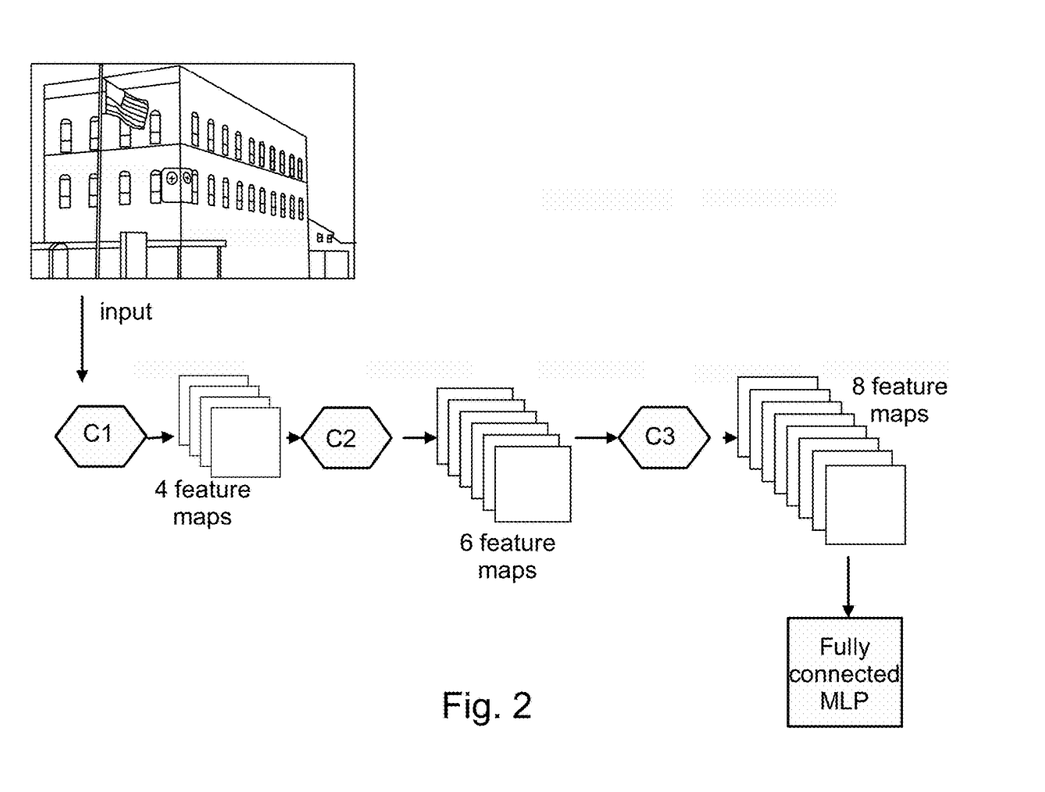
FIG. 2 shows an example of a Convolutional Neural Network applicable in computer vision systems.

In FIG. 2, the input to a CNN is an image, but any other media content object, such as video or audio file, could be used as well. Each layer of a CNN represents a certain abstraction (or semantic) level, and the CNN extracts multiple feature maps. The CNN in FIG. 2 has only three feature (or abstraction, or semantic) layers C1, C2, C3 for the sake of simplicity, but top-performing CNNs may have over 20 feature layers.

The first convolution layer C1 of the CNN consists of extracting 4 feature-maps from the first layer (i.e. from the input image). These maps may represent low-level features found in the input image, such as edges and corners. The second convolution layer C2 of the CNN, consisting of extracting 6 feature-maps from the previous layer, increases the semantic level of extracted features. Similarly, the third convolution layer C3 may represent more abstract concepts found in images, such as combinations of edges and corners, shapes, etc. The last layer of the CNN (fully connected MLP) does not extract feature-maps. Instead, it may use the feature-maps from the last feature layer in order to predict (recognize) the object class. For example, it may predict that the object in the image is a house.

It is appreciated that the goal of the neural network is to transform input data into a more useful output. One of the examples is classification, where input data is classified into one of N possible classes (e.g., classifying if an image contains a cat or a dog). Another example is regression, where input data is transformed into a Real number (e.g. determining the music beat of a song). Yet, another example is generating an image from a noise distribution.

Despite the significant performance improvement of image object detection, video object detection brings up new challenges on how to solve the object detection problem for videos robustly and effectively. Semantic video object segmentation, which aims to recognize and segment objects in video according to known semantic labels, has recently made much progress by incorporating middle- and high-level visual information, such as object detection, which enables building an explicit semantic notion of video objects. Such integration with object recognition and segmentation not only facilitates a holistic object model, but also provides a middle-level geometric representations for delineating semantic objects. However, these existing detection-segmentation based approaches typically fail to capture long-range and high-level contexts due to the lack of joint modeling and inference of contexts and segmentation. They typically directly employ local context, i.e., detected object proposals from independent frames associated in temporal domain as constraints to enforce labelling consistence. However, object detections as well as temporal association may contain significant errors due to changing object appearance and occlusions.

The present embodiments relate to constructing a novel graphical model which accounts for contextual information at various scales. This multiple scale contextual information may be represented by tracklets, object proposals and superpixels, where each of the nodes captures various spatial-temporal contexts and semantics from coarse to fine granularities.

Figure 3:
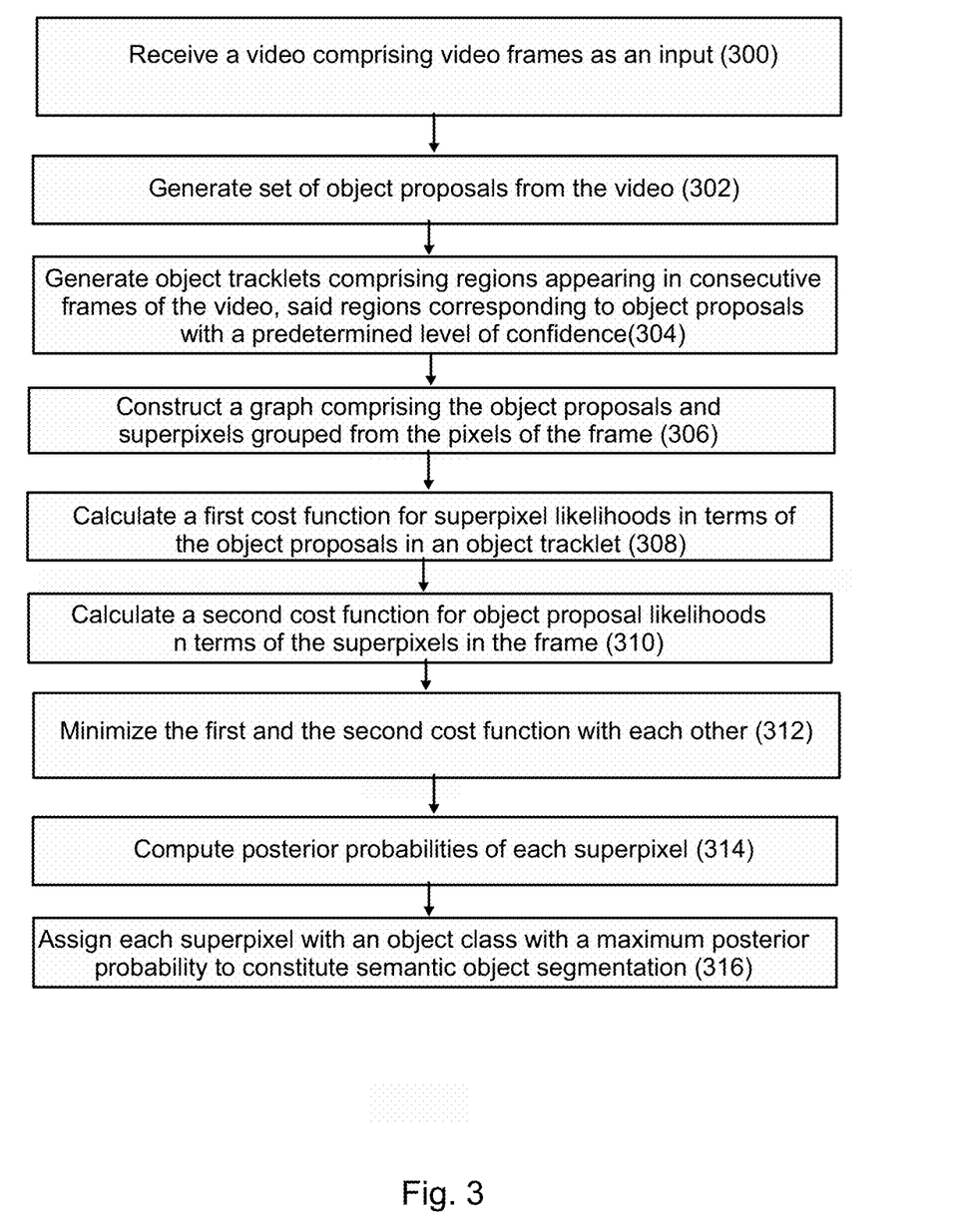
FIG. 3 shows a flowchart of a method according to an embodiment.

FIG. 3 shows, in a simplified manner, the method for video object detection according to an embodiment. The method comprises receiving (300) a video comprising video frames as an input; generating (302) set of object proposals from the video; generating (304) object tracklets comprising regions appearing in consecutive frames of the video, said regions corresponding to object proposals with a predetermined level of confidence; constructing (306) a graph comprising the object proposals and superpixels grouped from the pixels of the frame; calculating (308) a first cost function for superpixel likelihoods in terms of the object proposals in an object tracklet; calculating (310) a second cost function for object proposal likelihoods in terms of the superpixels in the frame; minimizing (312) the first and the second cost function with each other; computing (314) posterior probabilities of each superpixel; and assigning (316) each superpixel with an object class with a maximum posterior probability to constitute semantic object segmentation.

In the following, these steps are discussed in more detailed manner.

Object proposals may be generated by computing a hierarchical segmentation of an input video frame that is received by the system. The input video frame may be obtained by a camera device comprising the computer system of FIG. 1. Alternatively, the input video frame can be received through a communication network from a camera device that is external to the computer system of FIG. 1.

For generating the object proposals, a known object detector, such as a fast R-CNN (Fast Region-based Convolutional Neural Network), may be used. The Fast R-CNN takes as input a video frame and a set of object proposals. The network first processes the video frame with several convolutional layers and max pooling layers to produce a feature map. Then for each object proposal of the set of object proposals a region of interest (RoI) pooling layer extracts a fixed-length feature vector from the feature map. Each feature vector is fed into a sequence of fully connected layers that finally branch into two sibling output layers: one that produces softmax probabilities, and one that produces per-class bounding-box regression offsets. Negative object proposals are removed, and remaining object proposals have a predetermined level of (i.e. sufficient) confidence.

Figure 4:
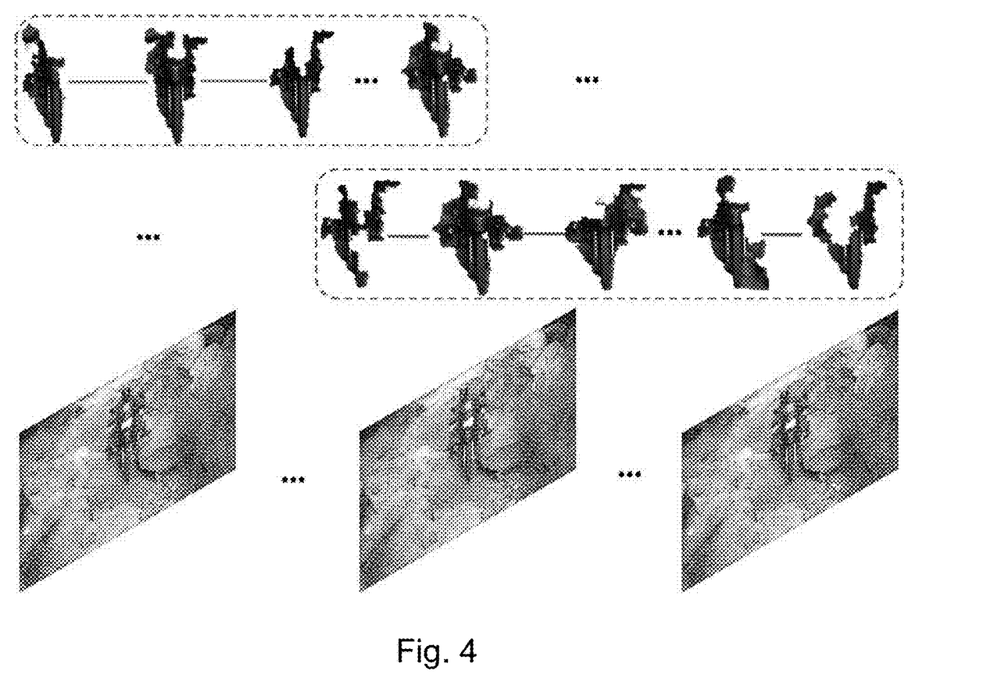
FIG. 4 shows an example of a tracklets extracted from a video sequence.

For each object class, tracklets are generated for example by tracking object proposals with said predetermined level of confidence. Herein, for example the methods described in Kang, K., Ouyang, W., Li, H. and Wang, X.: "*Object detection from video tubelets with convolutional neural networks*", in CVPR pp. 817-82, 2016, may be used for generating tracklets, which may contain noisy detections, i.e., false positive detections. Tracklets in this context refer to a set of object proposals that are extracted and associated temporally from consecutive video frames. FIG. 4 shows exemplars of tracklets extracted from a video sequence.

In the field of object detection, images are often represented with a limited number of pixel groups rather than individual pixels, thus decreasing significantly the number of computation nodes with the image, as well as the computational complexity. These pixel groups are generally called superpixels.

Figure 5:
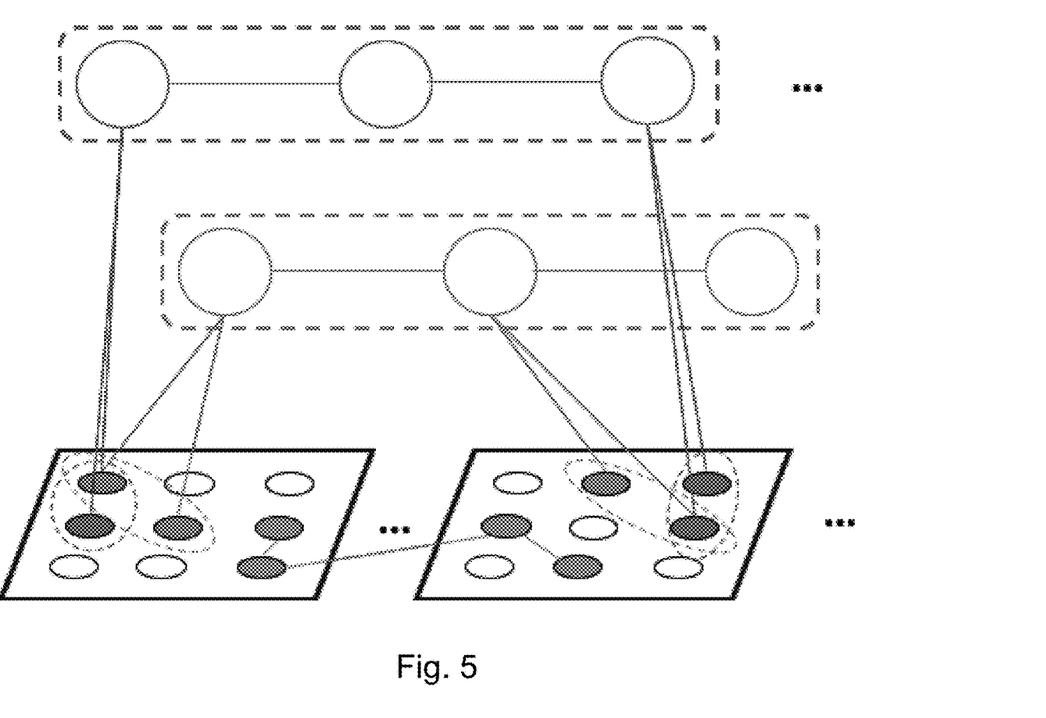
FIG. 5 illustrates an undirected graph according to an embodiment.

For processing the contextual information at various scales or level, an undirected graph G=(V, E) with superpixels and object proposals from tracklets as nodes V={X, Y} respectively is formed. FIG. 5 shows an example such graph. In the upper part of FIG. 5, the rectangles indicate tracklets each comprising a set of object proposals represented by circles. The object proposals are reflected to the graph (lower part of FIG. 5), as indicated by the lines. In the graph, each frame is divided into a superpixel map comprising a plurality of superpixels, indicated by circles, of equal size covering the area of the frame. On each frame, there may be more than one overlapping or non-overlapping object proposals corresponding to multiple or the same object instances. Thus, the one or more object proposals may be reflected to the same superpixel, and from one object proposal there may be a link to two or more superpixels.

FIGS. 4 and 5 show how the contextual information is provided on three levels. The tracklet level nodes encode long-range contexts and higher-level semantic synergies. The object proposal nodes enforce short-range dependencies and local geometric representation, while the superpixel nodes play the role as perceptually meaningful atomic regions to guarantee efficient and accurate segmentation despite that they are much less informative. The information flow across nodes of various granularities enables effective inference which accounts for both bottom-up and top-down semantic cues.

Simply enforcing the labeling of superpixels with higher-level contextual information quite often leads to mis-segmentations due to the inaccurate contextual information. However, the method steps of FIG. 3 and the embodiments related thereto provide a novel soft label consistency constraint to allow the flexible labelling of nodes within the same clique to some extent.

According to an embodiment, the method further comprises determining, from said graph, links between pairs of graph nodes. Herein, the links between pairs of graph nodes are defined as edges, denoted as E={$E_{XY}$, $E_{XX}$, $E_{YY}$}. $E_{XY}$ may be referred to as a cross-context edge, $E_{XX}$ may be referred to as a superpixel edge, and $E_{YY}$ may be referred to as an object proposal edge. The existence of these edges is determined based on the available multi-scale context cues in the graph, as described below.

According to an embodiment, the method further comprises calculating a first weight for connections between each object proposal and its constituent superpixels. The connections between each object proposal and its constituent superpixels are added as cross-context edges $E_{XY}$. Object proposal comprises higher-level cues of object instances, such as appearance and location information, and superpixel preserves local contextual information while aligning with intensity edges. The first weight $w_{im}^{XY}$ on edge $e_{im}^{XY} \in E^{XY}$ between superpixel $x_i$ and object proposal $y_m$ is defined as $$w_{im}^{XY} = [x_i \in y_m] \cdot e^{-(1-Pr(x_i|y_m))}$$

where [•] is the indicator function, and $Pr(x_i|y_m)$ is the likelihood of observing $x_i$ given the probability density function (PDF) of object proposal $y_m$. The probability density of object proposals may be estimated via any suitable density estimation, for example using the fast kernel density estimation disclosed in Yang, C., Duraiswami, R., Gumerov, N., and Davis, L. "*Improved Fast Gauss Transform and Efficient Kernel Density Estimation.*" in ICCV, vol. 1, p. 464.2003, applying it e.g. on CIE Lab color. The cross-context edges transfer the object instance level cues into the superpixels, and each object proposal can incorporate the complementary information of local context cues.

According to an embodiment, the method further comprises calculating a second weight for connections between spatially or temporally adjacent superpixels. All spatially or temporally adjacent superpixels are connected to form superpixel edges $E_{XX}$. Spatial adjacency is based on the superpixel neighborhood while the temporal adjacent superpixels are temporally connected by at least one optical flow motion vector over consecutive frames. The second weight for an edge $e_{ij}^{XX} \in E_{XX}$ is defined to reflect both the local appearance similarity and spatial/temporal distance as follows. Let $N_i^s$ be the set of superpixels in the spatial and temporal neighborhood of $x_i$, $$w_{ij}^{XX} = [x_j \in N_i^s] \cdot e^{+\chi^2(h_i, h_j) d^3(x_i, x_j)}$$

where $\chi^2(h_i, h_j)$ is the $\chi^2$ distance between L1-normalized CIE Lab color histograms $h_i, h_j$ of superpixels $x_i$ and $x_j$ respectively, and $d^3(x_i, x_j)$ indicates the spatial or temporal distance between $x_i$ and $x_j$. Temporal distance is measured by the ratio of pixels within the two superpixels that are connected by motion vectors over the union of two superpixels.

According to an embodiment, the method further comprises calculating a third weight for connections between sequential connections between object proposals within the same tracklet. The sequential connections between proposals within the same tracklet forms object proposal edges $E_{YY}$. As discussed above, sporadically inaccurate object proposals may lead to noisy higher level context information, which in turn is propagated to superpixels. Nonetheless, object proposals which constitute the same tracklet collectively encode the dynamic intrinsic structure of objects, i.e. not only accounting for the motion of object but also the evolution of appearance over time. Object proposal edges are defined as the sequential connections between proposals within the same tracklet. These edges enable information flowing within higher-level context cues to compensate the local noisy information. The third weight for an edge $e_{mn}^{YY} \in E_{YY}$ between two object proposals $y_m$ and $y_n$ is defined as $$w_{mn}^{YY} = [y_n \in \mathcal{N}_m^t] \cdot e^{-(1 - \langle f_m, f_n \rangle)}$$

where $\mathcal{N}_m^t$ is the neighborhood of $y_n$, in its tracklet, f• is the L2-normalized CNN feature of proposal, and <•> indicates the inner-product. The third weight exploits the higher-level semantics in deep feature space.

For facilitating the joint inference of likelihoods for superpixels and object proposals respectively, a first and a second cost function may be defined as quadratic cost function, thereby harnessing the complementary contextual information to each other.

The superpixel likelihoods $u_l$ may be inferred by incorporating the object proposal likelihoods v; as higher-level context cues in a principled manner By characterizing the relationship between all nodes in the graph, the first quadratic cost function $J_l^X$ of superpixel likelihoods $u_l$ with respect to a label l is as follows. Let the diagonal element of node degree matrix $D^X = \text{diag}([d_1^X, \ldots, d_{N_x}^X])$ be defined as $d_i^X = \sum_{j=1}^{N_x} w_{ij}^{XX}$ $$J_l^X = J_{l,U}^X + J_{l,P}^X + J_{l,C}^X \quad (1)$$

$$= \sum_{i=1}^{N_X} \lambda^X d_i^X (u_{il} - \bar{u}_{il})^2 + \sum_{i,j=1}^{N_X} w_{ij}^{XX} (u_{il} - \bar{u}_{il})^2 + \sum_{i=1}^{N_X} \pi d_i^X (u_{il} - \bar{u}_{il})^2$$

where $\lambda$ and $\pi$ are parameters. The superpixel probability $\tilde{u}_{il}$ is the initial likelihood with respect to label l. The estimated likelihood $\tilde{u}_{il}$ of superpixel $x_i$ from object proposal likelihood $y_{ml} \in V_l$ is define as the weighted average of its corresponding object proposal likelihoods, $$\bar{u}_{il} = \sum_{m=1}^{N_Y} p_{im}^{XY} v_{ml},$$

where $$p_{im}^{XY} = \frac{w_{im}^{XY}}{\sum_{m=1}^{N_Y} w_{im}^{XY}}.$$

In the first cost function, $J_{l,U}^X$ and $J_{l,P}^X$ are the fitting constraint and smoothness constraint respectively, while $J_{l,C}^X$ is the contextual constraint.

In the first cost function, $J_{l,U}^X$ encourages superpixels to have the initial likelihood, which is controlled by $\lambda^X$ measuring how much the inferred likelihood should agree with the initial likelihood. $J_{l,P}^X$ promotes the continuity of inferred likelihood among adjacent nodes lying in a close vicinity in the feature space. $J_{l,C}^X$ facilitates the inference of each superpixel to be aware of higher-level context information. As a result, object proposals in tracklet encode richer semantics and intrinsic dynamics of the object, which can be propagated to its constituent superpixels during inference.

In order to solve equation (1), the object proposal likelihoods $V_l$ are also required to be estimated by referring to the superpixel likelihoods $U_l$ in graph G. Similar to (1), the second quadratic cost function $J_l^Y$ of object proposal likelihoods VI is defined as follows. Let the diagonal element of node degree matrix $D^Y = \text{diag}([d_1^Y, \ldots, d_{N_Y}^Y])$ be defined as $d_m^Y = \sum_{n=1}^{N_Y} w_{mn}^{YY}$, $$J_l^Y = J_{l,U}^Y + J_{l,P}^Y + J_{l,C}^Y \quad (2)$$

$$= \sum_{i=1}^{N_Y} \lambda^Y d_m^Y (v_{ml} - \bar{v}_{ml})^2 + \sum_{m,n=1}^{N_Y} w_{mn}^{YY} (v_{ml} - v_{nl})^2 + \sum_{i=1}^{N_Y} \psi d_m^Y (v_{ml} - \tilde{v}_{ml})^2$$

where $\lambda^Y$ and $\psi$ are parameters, $\tilde{u}_{ml}$ is the initial likelihood of object proposal m given label l, and the estimated likelihood $\tilde{u}_{ml}$ of the object proposal $y_n$, is defined by incorporating local context cues, i.e., superpixel likelihoods $U_l$. $\tilde{u}_{ml}$ is computed as the weighted average of its constituent superpixel likelihoods:

$$\bar{v}_{ml} = \sum_{i=1}^{N_X} p_{mi}^{YX} u_{il},$$

where $$p_{mi}^{XY} = \frac{w_{mi}^{XY}}{\sum_{i=1}^{N_X} w_{mi}^{YX}}.$$

Similarly, the equation (2) consists of three terms, i.e., $J_{l,U}^Y$, $J_{l,P}^Y$ and $J_{l,C}^Y$. In the second cost function, $J_{l,U}^Y$ is the fitting constraint that encourages each object proposal to have its initial likelihood. $U_{l,P}^Y$ is the smoothness constraint which promotes label continuity among object proposals in the same tracklet to preserve the spatial-temporal coherence of object. The third term $J_{l,C}^Y$ is the contextual constraint which collects local context cues in a bottom-up manner to refine the object proposal likelihood $V_l$ using more locally informative superpixel likelihoods $U_l$, since it cannot guarantee that the object proposals are always extracted preserving true object boundaries in natural imageries.

Since the first and second cost functions $U_l$ and $V_l$ are complementary to each other, they are preferably minimized simultaneously with each other. According to an embodiment, the first and second cost functions are reformulated as matrix forms with respect to the likelihoods $U_l = [U_{il}]_{N_X \times 1}$ and $V_l = [u_{ml}]_{N_X \times 1}$ from the initial likelihoods $\tilde{U}_l = [\tilde{u}_{il}]_{N_X \times 1}$ and $\tilde{V}_l = [\tilde{u}_{ml}]_{N_Y \times 1}$ respectively, $$J_l^X = (U_l - \tilde{U}_l)^T D^X \Lambda^X (U_l - \tilde{U}_l) + U_l^T (D_X - W_X) U_l + \pi (U_l - P^{XY} V_l)^T D^X (U_l - P^{XY} V_l) \quad (3)$$

$$J_l^Y = (V_l - \tilde{V}_l)^T D^Y \Lambda^Y (V_l - \tilde{V}_l) + V_l^T (D^Y - W^Y) V_l + \psi (V_l - P^{YX} U_l)^T D^Y (V_l - P^{YX} U_l) \quad (4)$$

where $W^X=[w_{ij}^{XX}]_{N_X \times N_X}$ and $W^Y=[w_{ij}^{YY}]_{N_Y \times N_Y}$. The contextual dependencies between superpixels and their corresponding object proposals in graph G are formulated by $P^{XY}=[p_{im}^{XY}]_{N_X \times N_Y}$ and $P^{YX}=[p_{mi}^{YX}]_{N_Y \times N_X}$. The diagonal elements of $N_X \times N_X$ matrix $\Lambda^X=\text{diag}([\lambda^X, \ldots, \lambda^X])$ and $N_Y \times N_Y$ and matrix $\Lambda_Y=\text{diag}([\Lambda_Y, \ldots, \Lambda^Y])$ are the parameters $\lambda^X$ and $\lambda^Y$ respectively.

By differentiating $J_l^X$ and $J_l^Y$ with respect to $U_l$ and $V_l$ respectively, we have $$\frac{\partial J_l^X}{\partial U_l} = U_l(I^X - P^X) + \Lambda^X(U_l - \tilde{U}_l) + \pi(U_l - P^{XY}V_l) = 0 \quad (5)$$

$$\frac{\partial J_l^Y}{\partial V_l} = V_l(I^Y - P^Y) + \Lambda^Y(V_l - \tilde{V}_l) + \psi(V_l - P^{YX}U_l) = 0 \quad (6)$$

where $P^X=D^{X-1}W^X$ (or $P^Y=D_{Y-1}W^Y$), and $I^X$ (or $I^Y$) is identity matrix.

By denoting all likelihoods as $Z_l=[U_l, V_l]$ and initial likelihoods as $\tilde{Z}_l=[\tilde{U}_l, \tilde{V}_l]$, equations (5) and (6) can be jointly transformed into $$(I-(I-\Gamma)\Pi)Z_l = \Gamma \tilde{Z}, \quad (7)$$

Denoting $B=I-(I-\Gamma)\Pi$, equation (7) can be solved by a sparse matrix inversion $Z_l=B^{-1}\Gamma\tilde{Z}$.

According to an embodiment, posterior probabilities of each superpixel are computed cording to Bayes rule. For example, posterior probabilities of each superpixel with respect to label l can then be computed following Bayes rule $$p(l|x_i) = \frac{p(x_i|l)p(l)}{\sum_{l'=1}^{L} p(x_i|l')p(l')} = \frac{u_{il}}{\sum_{l'=1}^{L} u_{il'}} \quad (8)$$

Each superpixel is finally assigned with the label corresponding to the class with the maximum a posterior probability, which constitutes to the semantic object segmentation, $$\hat{l}_i = \arg\max_l p(l|x_i)$$

An apparatus according to an embodiment comprises means for receiving a video comprising video frames as an input; means for generating set of object proposals from the video; means for generating object tracklets comprising regions appearing in consecutive frames of the video, said regions corresponding to object proposals with a predetermined level of confidence; means for constructing a graph comprising the object proposals and superpixels grouped from the pixels of the frame; means for calculating a first cost function for superpixel likelihoods in terms of the object proposals in an object tracklet; means for calculating a second cost function for object proposal likelihoods in terms of the superpixels in the frame; means for minimizing the first and the second cost function with each other; means for computing posterior probabilities of each superpixel; and means for assigning each superpixel with an object class with a maximum posterior probability to constitute semantic object segmentation.

A skilled person appreciates that any of the embodiments described above may be implemented as a combination with one or more of the other embodiments, unless there is explicitly or implicitly stated that certain embodiments are only alternatives to each other.

The various embodiments may provide advantages over state of the art. The embodiments as described herein enable to account for contextual cues at various scales or levels due to three-fold graphical model of tracklets, object proposals and superpixels. The embodiments enable to provide, besides middle- and high-level visual information, but also long-range and higher-level contextual information to the semantic object segmentation process.

The various embodiments of the invention can be implemented with the help of computer program code that resides in a memory and causes the relevant apparatuses to carry out the invention. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment.

It is obvious that the present invention is not limited solely to the above-presented embodiments, but it can be modified within the scope of the appended claims.

The invention claimed is:

1. A method, comprising:
receiving a video comprising video frames as an input;
generating a set of object proposals from the video, wherein the generating of the set of object proposals comprises determining that respective object proposals of the set have at least a predetermined level of confidence;
generating object tracklets comprising regions appearing in consecutive one of the video frames of the video, said regions corresponding to the set of object proposals;
constructing a graph comprising the set of object proposals and superpixels grouped from pixels of the video frames;
calculating a first cost function for superpixel likelihoods in terms of the corresponding object proposals in a respective object tracklet of the generated object tracklets;
calculating a second cost function for object proposal likelihoods in terms of the superpixels in the video frames;
minimizing the first and the second cost function with each other;
computing posterior probabilities of the superpixels; and
assigning the superpixels with a respective object class based on a maximum posterior probability of respective posterior probabilities of the computed posterior probabilities to constitute semantic object segmentation.

2. The method according to claim 1, further comprising determining, from said graph, links between pairs of nodes of the graph.

3. The method according to claim 2, further comprising calculating a first weight for connections between a respective object proposal of the set of object proposals and its constituent superpixels.

4. The method according to claim 3, further comprising calculating a second weight for connections between spatially or temporally adjacent superpixels.

5. The method according to claim 3, further comprising calculating a third weight for sequential connections between object proposals within same object tracklet.

6. The method according to claim 4, wherein the first weight and the second weight are used as weights in the first cost function.

7. The method according to claim 5, wherein the first weight and the third weight are used as weights in the second cost function.

8. The method according to claim 1, wherein the posterior probabilities of the superpixels are computed according to Bayes rule.

9. An apparatus comprising at least one processor, non-transitory memory including computer program code, the memory and the computer program code configured to, with the at least one processor, cause the apparatus to:
receive a video comprising video frames as an input;
generate a set of object proposals from the video, wherein generating the set of object proposals comprises determining that respective object proposals of the set have at least a predetermined level of confidence;
generate object tracklets comprising regions appearing in consecutive ones of the video frames of the video, said regions corresponding to the set of object proposals;
construct a graph comprising the set of object proposals and superpixels grouped from pixels of the video frames;
calculate a first cost function for superpixel likelihoods in terms of corresponding object proposals in a respective object tracklet of the generated object tracklets;
calculate a second cost function for object proposal likelihoods in terms of the superpixels in the video frames;
minimize the first and the second cost function with each other;
compute posterior probabilities of the superpixels; and
assign the superpixels with a respective object class based on a maximum posterior probability of respective posterior probabilities of the computed posterior probabilities to constitute semantic object segmentation.

10. The apparatus according to claim 9, further comprising computer program code configured to cause the apparatus to determine, from said graph, links between pairs of nodes of the graph.

11. The apparatus according to claim 10, further comprising computer program code configured to cause the apparatus to calculate a first weight for connections between a respective object proposal of the set of object proposals and its constituent superpixels.

12. The apparatus according to claim 11, further comprising computer program code configured to cause the apparatus to calculate a second weight for connections between spatially or temporally adjacent superpixels.

13. The apparatus according to claim 11, further comprising computer program code configured to cause the apparatus to calculate a third weight for sequential connections between object proposals within same object tracklet.

14. The apparatus according to claim 12, wherein the first weight and the second weight are used as weights in the first cost function.

15. The apparatus according to claim 13, wherein the first weight and the third weight are used as weights in the second cost function.

16. The apparatus according to claim 9, further comprising computer program code configured to cause the apparatus to compute the posterior probabilities of the superpixels according to Bayes rule.

17. A computer program product embodied on a non-transitory computer readable medium, comprising computer program code configured to, when executed on at least one processor, cause an apparatus to:
receive a video comprising video frames as an input;
generate a set of object proposals from the video, wherein generating the set of object proposals comprises determining that respective object proposals of the set have at least a predetermined level of confidence;
generate object tracklets comprising regions appearing in consecutive ones of the video frames of the video, said regions corresponding to the set of object proposals;
construct a graph comprising the set of object proposals and superpixels grouped from pixels of the video frames;
calculate a first cost function for superpixel likelihoods in terms of corresponding object proposals in a respective object tracklet of the generated object tracklets;
calculate a second cost function for object proposal likelihoods in terms of the superpixels in the video frames;
minimize the first and the second cost function with each other;
compute posterior probabilities of the superpixels; and
assign the superpixels with a respective object class based on a maximum posterior probability of respective posterior probabilities of the computed posterior probabilities to constitute semantic object segmentation.

18. The computer program product according to claim 17, wherein the apparatus is further caused to determine, from said graph, links between pairs of nodes of the graph.

19. The computer program product according to claim 18, wherein the apparatus is further caused to calculate a first weight for connections between a respective object proposal of the set of object proposals and its constituent superpixels.

20. The computer program product according to claim 18, wherein the apparatus is further caused to calculate a second weight for connections between spatially or temporally adjacent superpixels.

* * * * *